Aug. 12, 1952 — G. E. FARMER — 2,606,390
RESILIENT FISHING LEADER
Filed Sept. 19, 1950
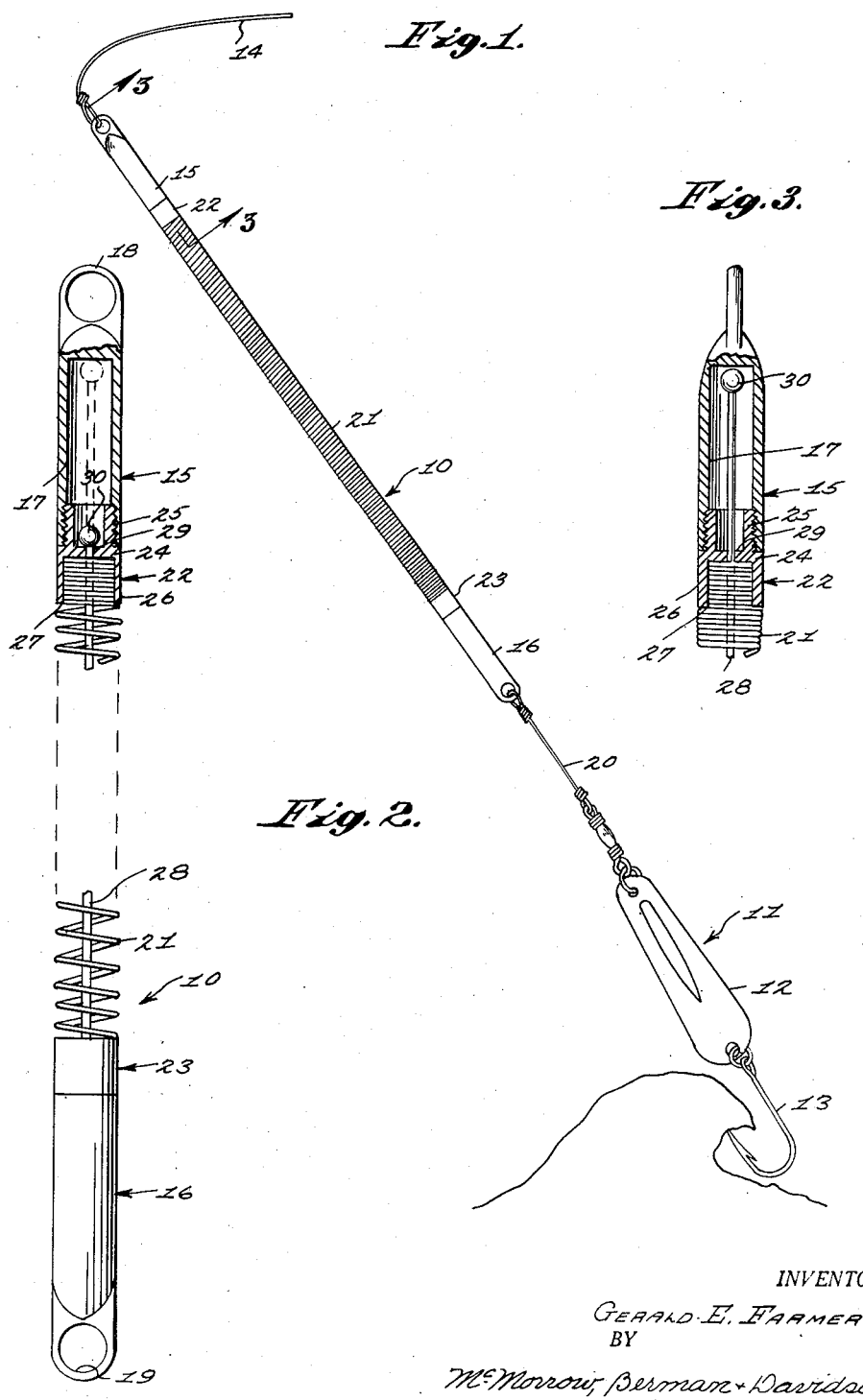
INVENTOR.
GERALD E. FARMER
BY
McMorrow, Berman & Davidson
ATTORNEYS Patented Aug. 12, 1952

2,606,390

UNITED STATES PATENT OFFICE 2,606,390

RESILIENT FISHING LEADER

Gerald E. Farmer, Thorn Hill, Tenn.

Application September 19, 1950, Serial No. 185,561

3 Claims. (Cl. 43—42.72)

This invention relates to fishing tackle, and more particularly to a resilient leader for connecting the assembly of an artificial lure and hook to a fishing line.

An object of this invention is to provide a leader for the support of the assembly of an artificial lure and hook which is particularly adapted for effecting the release of said assembly when the latter becomes snagged or fouled on an under-water obstruction.

Another object of the invention is to provide a leader which is adapted to yieldably support the fishhook on a line, so that, upon a heavy strike by a fish, the striking force will be gradually transmitted to the line.

A further object of this invention is to provide a leader including a resilient element which is provided with means for constricting the extensile movement of said resilient element prior to reaching the elastic limit thereof.

A still further object of the invention is to provide a leader including the resilient element which has a streamline surface to thereby particularly adapt the leader for casting.

A still further object of this invention is to provide a resilient leader for connecting the assembly of an artificial lure and hook to a fishing line which is relatively simple in structure and cheap to manufacture.

The above and still further objects and advantages of the invention will become apparent upon consideration of the following detailed description of the invention when taken in conjunction with the accompanying drawings, wherein:

Figure 1 is an elevational view of the resilient leader of the present invention, shown supported between a fishing line and the assembly of an artificial lure and hook, the latter being snagged upon an under-water obstruction;

Figure 2 is an elevational view of the resilient leader of the present invention, with parts broken away and shown in section; and Figure 3 is an enlarged, fragmentary, sectional view taken along the line 3—3 of Figure 1.

Referring now more particularly to the drawings, wherein like reference numerals have been used throughout the several views to designate like parts, there is shown the resilient leader of the present invention, generally designated by the reference numeral 10, connected between the assembly 11 of an artificial lure 12 and a hook 13, and a fishing line 14.

The resilient leader 10 embodies a pair of cylindrical sections 15 and 16 disposed in spaced, end-to-end, confronting relation with respect to each other, there being a bore 17 extending inwardly from the confronting end of each of the sections 15 and 16, and terminating adjacent to and spaced from the non-confronting end thereof. Contiguous to its non-confronting end, the section 15 is provided with an aperture 18 adapted for the reception of the fishing line 14, to thereby secure the section 15 to the fishing line 14. The section 16 is similarly provided with an aperture 19 contiguous to its non-confronting end adapted to receive a securing element 20 which carries the assembly 11 of the artificial lure 12 and hook 13.

Disposed between the confronting ends of the cylindrical sections 15 and 16 is a coil spring 21 which is secured between the sections 15 and 16 in alignment therewith. The coil spring 21 is secured between the sections 15 and 16 by the support and guide elements 22 and 23, the support and guide element 22 being detachably secured to the cylindrical section 15 and receiving one end of the coil spring and the support and guide element 23 being detachably secured to the cylindrical section 16 and embracingly receiving and supporting the other end of the coil spring 21. Since the structure of the support and guide elements 22 and 23 are the same, it will suffice to describe only one in detail. The support and guide element 22 embodies a plate 24 which is supported in bridging relation with respect to the open end of the bore 17 of the cylindrical section 15 by means of the exteriorly threaded extension 25 which is carried transversely of the plate 24 and is in threaded engagement with the oppositely threaded bounding wall of the bore 17. The support and guide element 22 further embodies a sleeve 26 carried on the opposite face of the plate 24 and cooperating with the latter to form a cylindrical bore 27 for the reception of the adjacent end of the coil spring 21. The coil spring is secured within the bore 27 by any suitable means.

Extending longitudinally within the coil spring 21 is a guide rod 28 which has one end slidably received and supported within the cylindrical section 15 and has the other end slidably received and supported within the cylindrical section 16. It is to be noted that the ends of the guide rod 28 are extended through apertures 29 provided in the transverse plates 24 of the support and guide elements 22 and 23. Accordingly, the guide rod 28 is mounted for longitudinal movement with respect to the cylindrical sections 15 and 16.

Carried by each end of the guide rod 28 is a stop 30 which is engageable with the plate 24 of the adjacent one of the support and guide elements in a select position of the extensile movement of the coil spring 21, to thereby limit the degree of extension of said spring. As clearly shown in Figure 3, the stop 30 is positioned contiguous to the terminating end of the bore 17 of the cylindrical section 15 when the spring 21 is not extended, and as clearly shown in Figure 2, the stop 30 engages with the plate 24 when the spring 21 is extended. The select position of the extensile movement of the coil spring 21, in which the engagement between the stops 30 and the plates 24 of the support and guide elements is effected, will be predetermined by the elastic limit of the spring used.

It is to be noted that the outer diameters of the cylindrical sections 15 and 16, the sleeves 26 of the support and guide elements 22 and 23 and the coil spring 21 are substantially equal to each other, to thereby form an elongated, streamlined, cylindrical body having a continuous peripheral surface. The outer diameter of the streamlined body thus formed can be selected so that the leader can be extended through the guide tip on a fishing rod.

The guide elements 22 and 23 form a detachable part of the cylindrical sections, so that the sleeves 26 define prolongations of the side walls of the sections and form open ends on the sections. The plates 24 define transverse partitions in the sections, adjacent the open confronting ends, and cooperate with the sleeves in seating the opposing ends of the coil spring.

In effecting the release of the snagged or fouled assembly of an artificial lure and hook, as illustrated in Figure 1, a tight pull is exerted on the line 14 to extend the spring 21 into the position illustrated in Figure 2. Upon suddenly releasing the line 14, a jerking force will be applied to the snagged hook 13 and kick the latter free from the obstruction. The device of the present invention is particularly adapted for use in deep sea fishing to aid in the landing of larger fish, since the striking force applied to the hook will be gradually transmitted through the coil spring 21 to the line 14.

Although only one embodiment of the resilient leader of the present invention has been described, it is readily apparent that numerous modifications can be made without departing from the spirit of the invention as set forth in the appended claims.

What I claim is:
1. A leader for connecting the assembly of an artificial lure and hook to a fishing line comprising a pair of hollow bodies having confronting open ends and opposed closed ends, said closed ends being respectively attachable to a line and the assembly, each of said bodies having transverse partitions formed adjacent their open ends, a coil spring seated at its opposing ends on said partitions, said partitions having aligned openings formed therein, a rod slidably disposed through the openings and extending longitudinally within said coil spring, and a stop formed on the opposing ends of the rod and engageable on the partitions to limit the degree of expansion of the spring.

2. A leader for connecting the assembly of an artificial lure and hook to a fishing line comprising a pair of hollow bodies having confronting open ends and opposed closed ends, said closed ends having means formed thereon for receiving a line and the assembly, each of said bodies having transverse partitions formed adjacent their open ends, a coil spring seated at its opposing ends on said partitions, said partitions having aligned openings formed therein, a rod slidably disposed through the openings and extending longitudinally within said coil spring, and a stop formed on the opposing ends of the rod and engageable on the partitions to limit the degree of expansion of the spring.

3. A leader for connecting the assembly of an artificial lure and hook to a fishing line comprising a pair of cylindrical sections disposed in spaced end to end confronting relation with respect to each other, said sections having confronting open ends and opposed closed ends, said closed ends being respectively attachable to a a line and the assembly, each of said sections having transverse partitions formed adjacent their open ends, a coil spring seated at its opposing ends on said partitions, said partitions having openings formed therein, a rod slidably disposed through the openings and extending longitudinally within said coil spring, and a stop formed on each end of the rod and engageable on the partitions to limit the degree of expansion of the spring.

GERALD E. FARMER.

REFERENCES CITED

The following references are of record in the file of this patent:

UNITED STATES PATENTS

| Number | Name | Date |
| --- | --- | --- |
| 304,632 | Flagg | Sept. 2, 1884 |
| 1,723,814 | Scholl | Aug. 6, 1929 |

FOREIGN PATENTS

| Number | Country | Date |
| --- | --- | --- |
| 517,474 | France | Dec. 17, 1920 |